(12) United States Patent
Mohanty et al.

(10) Patent No.: US 11,593,567 B2
(45) Date of Patent: Feb. 28, 2023

(54) INTELLIGENT CONVERSATIONAL GATEWAY

(71) Applicant: Dell Products L.P., Round Rock, TX (US)

(72) Inventors: Bijan Kumar Mohanty, Austin, TX (US); Dhilip S. Kumar, Bangalore (IN); Hung Dinh, Austin, TX (US); Rajesh Krishnan, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 232 days.

(21) Appl. No.: 17/077,357

(22) Filed: Oct. 22, 2020

(65) Prior Publication Data
US 2022/0129642 A1    Apr. 28, 2022

(51) Int. Cl.
| | | |
|---|---|---|
| *G06F 40/00* | (2020.01) | |
| *G06F 40/40* | (2020.01) | |
| *G06N 3/04* | (2023.01) | |
| *G06F 40/20* | (2020.01) | |
| *G06F 40/30* | (2020.01) | |
| *G06N 3/08* | (2023.01) | |
| *H04L 51/02* | (2022.01) | |

(52) U.S. Cl.
CPC .............. *G06F 40/40* (2020.01); *G06F 40/20* (2020.01); *G06F 40/30* (2020.01); *G06N 3/04* (2013.01); *G06N 3/08* (2013.01); *H04L 51/02* (2013.01)

(58) Field of Classification Search
CPC ......... H04L 51/02; G06F 40/40; G06F 40/20; G06F 40/30; G06F 40/35; G06N 3/04; G06N 3/08
See application file for complete search history.

(56) References Cited

U.S. PATENT DOCUMENTS

| 10,970,493 | B1* | 4/2021 | Lee ..................... G06N 3/0454 |
|---|---|---|---|
| 2019/0213490 | A1* | 7/2019 | White .................. G06Q 10/10 |
| 2020/0065848 | A1* | 2/2020 | Gupta ............... G06Q 30/0233 |
| 2020/0342874 | A1* | 10/2020 | Teserra .................. G06F 40/35 |
| 2021/0119945 | A1* | 4/2021 | Soh ........................ G06N 20/00 |
| 2022/0058342 | A1* | 2/2022 | Fan ........................ G06N 20/00 |
| 2022/0101220 | A1* | 3/2022 | Wicaksono ......... H04M 3/5233 |

OTHER PUBLICATIONS

Wikipedia, "Natural Language," https://en.wikipedia.org/w/index.php?title=Natural_language&oldid=977532848, Sep. 9, 2020, 3 pages.

(Continued)

*Primary Examiner* — Huyen X Vo
*Assistant Examiner* — Philip H Lam
(74) *Attorney, Agent, or Firm* — Ryan, Mason & Lewis, LLP

(57) ABSTRACT

A method comprises receiving at least one natural language input, and determining an intent of the at least one natural language input. In the method, a virtual assistant of a plurality of virtual assistants is recommended to respond to the at least one natural language input based at least in part on the determined intent, and the at least one natural language input is transmitted to the recommended virtual assistant. The determining and recommending are performed using one or more machine learning models, and the plurality of virtual assistants respectively correspond to a plurality of different functions of an enterprise.

20 Claims, 15 Drawing Sheets

(56) References Cited

OTHER PUBLICATIONS

Wikipedia, "Natural-language Generation," https://en.wikipedia.org/w/index.php?title=Natural-language_generation&oldid=983323430, Oct. 13, 2020, 7 pages.

Dell, "Support for Dell EMC OpenManage Integration with ServiceNow," https://www.dell.com/support/article/en-us/sln317784/support-for-dell-emc-openmanage-integration-with-servicenow?lang=en, Aug. 19, 2020, 3 pages.

Wikipedia, "Chatbot," https://en.wikipedia.org/w/index.php?title=Chatbot&oldid=982264678, Oct. 7, 2020, 12 pages.

\* cited by examiner

*FIG. 6*

```
In [ ]: import numpy as np
        import pandas as pd
        from nltk.corpus import stopwords
        from nltk.tokenize import word_tokenize
        from nltk.stem.lancaster import LancasterStemmer
        import nltk
        import re
        from sklearn.preprocessing import OneHotEncoder
        import matplotlib.pyplot as plt
        from keras.preprocessing.text import Tokenizer
        from keras.preprocessing.sequence import pad_sequences
        from keras.utils import to_categorical
        from keras.models import Sequential, load_model
        from keras.layers import Dense, LSTM, Bidirectional, Embedding, Dropout
        from keras.callbacks import ModelCheckpoint def load_dataset(filename) :
            df = pd.read_csv(filename, encoding = "latin1", names = ["Sentence", "Intent"])
            print(df.head())
            intent = df["Intent"]
            unique_intent = list(set(intent))
            sentences = list(df["Sentence"])

return (intent, unique_intent, sentences)

intent, unique_intent, sentences = load_dataset("IntentClassification_data.csv")
        print(sentences[:5])
```

FIG. 8
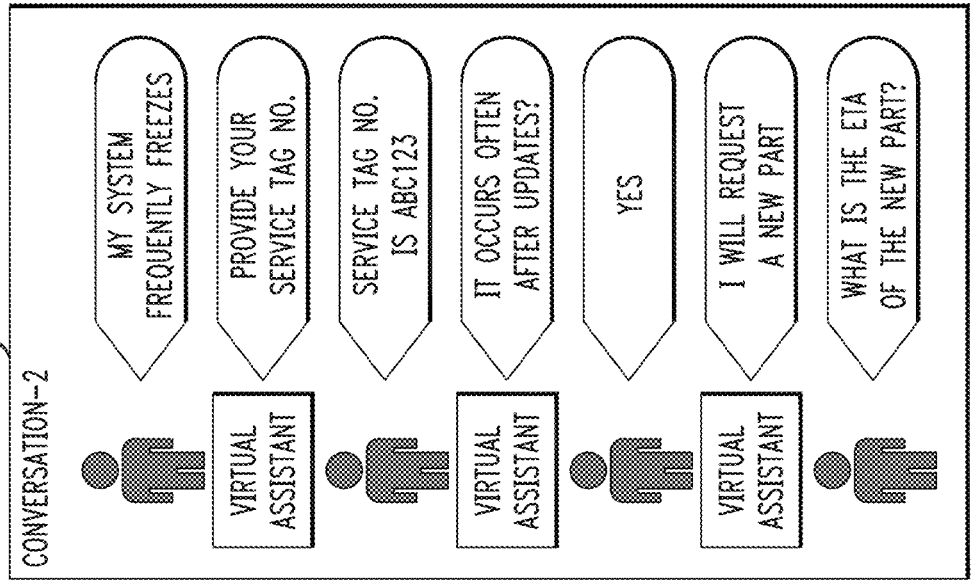
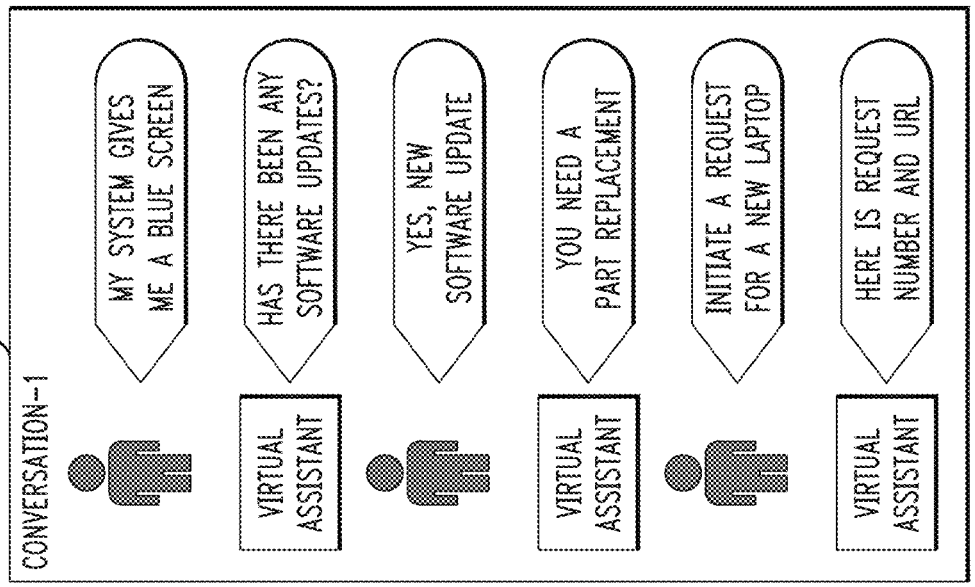

FIG. 10

| DIALOG TO BE GENERATED | TOKEN TO BE MATCHED |
|---|---|
| MY WORK DEVICE IS UNUSABLE, SO THIS NEEDS TO BE ADDRESSED URGENTLY. | 'system', 'bsod', 'blue screen', 'not working', 'work machine', 'work laptop' |

| PREDICTOR | LABEL |
|---|---|
| MY | WORK |
| MY WORK | DEVICE |
| MY WORK DEVICE | IS |
| MY WORK DEVICE IS | UNUSABLE |

```
def create_model (max_sequence_len, total_words) :
    input_len = max_sequence_len - 1
    model = Sequential ()

# Add Input Embedding Layer
    model.add(Embedding(total_words, 10, input_length=input_len))

# Add Hidden Layer 1 - LSTM Layer
    model.add(LSTM(100))
    model.add(Dropout(0.1))

# Add Output Layer
    model.add(Dense(total_words, activation='softmax'))

model.compile(loss='categorical_crossentropy', optimizer='adam')

return model model = create_model(max_sequence_len, total_words)
model.summary ()

model.fit(predictors, label, epochs=100, verbose=5)

def generate_text(seed_text, next_words, model, max_sequence_len):
    for _ in range(next_words):
        token_list = tokenizer.texts_to_sequences([seed_text])[0]
        token_list = pad_sequences([token_list], maxlen=max_sequence_len-1, padding='pre')
        predicted = model.predict_classes(token_list, verbose=0)
```

1300

| INTENT | SENTIMENT | PRIORITY | REGION | LANGUAGE | VIRTUAL ASSISTANT |
|---|---|---|---|---|---|
| Support.Assist | NEUTRAL | NORMAL | AMERICAS | ENGLISH | 1 (support) |
| HR.Question | NEUTRAL | NORMAL | AMERICAS | ENGLISH | 2 (hr.normal) |
| HR.support | NEGATIVE | URGENT | AMERICAS | ENGLISH | 3 (hr.express) |

FIG. 16

```
1600 routing_data = pd.read_csv("data/VirtualAsstRouting.csv", sep=',', header= None)

print (routing_data)

print ("Dataset Length: ", len(routing_data))
print ("Dataset Shape: ", routing_data.shape)

clean_routing_data = routing_data[routing_data[6] != '?']
print(clean_routing_data)

X = clean_routing_data.values[:, 1:11]
Y = clean_routing_data.values[:, 0]

X_train, X_test, y_train, y_test = train_test_split(X, Y, test_size = 0.3, random_state = 100)

y_train = y_train.astype('int')
y_test = y_test.astype('int')

print(y_train)

trained_model = RandomForestClassifier()
trained_model.fit(X_train, y_train)

predictions = trained_model.predict(X_test)
```

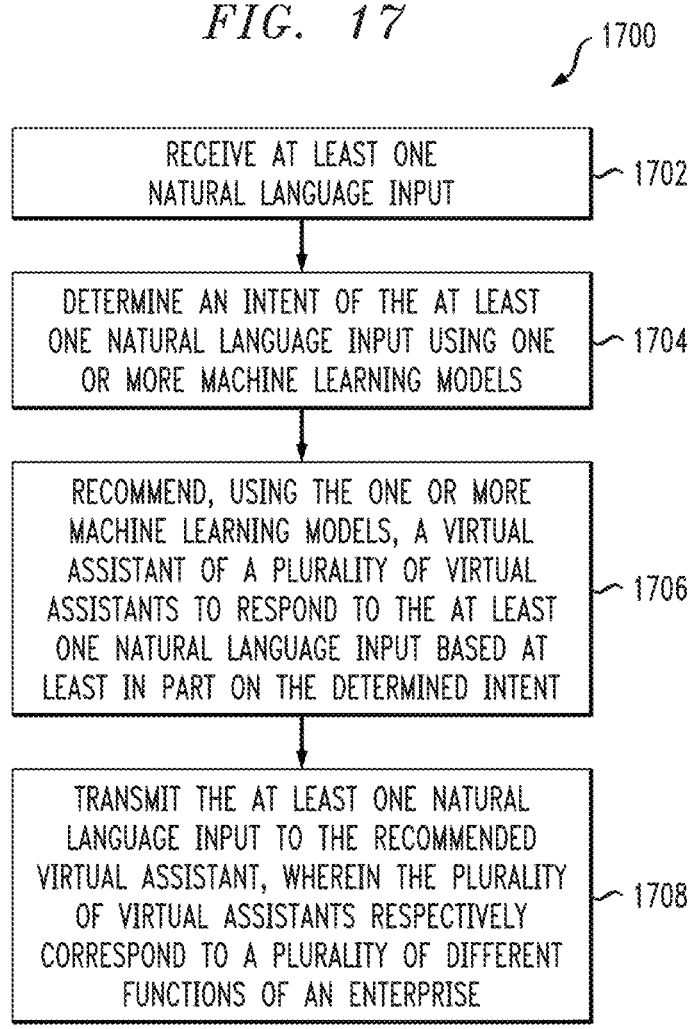

INTELLIGENT CONVERSATIONAL GATEWAY

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to providing conversational gateways in such information processing systems.

BACKGROUND

Conversational artificial intelligence (AI) is a significant enterprise enabler in today's modern enterprise processes. Enterprises typically desire automated virtual assistants (e.g., "bots" or "chatbots") that are always available (e.g., 24 hours per day, 7 days per week) to address customer or other user concerns. Conversational AI systems attempt to respond to user queries by providing meaningful answers with recommended actions for the users to perform.

Conversational AI systems face a number of challenges when attempting to identify the content of communications and conversations. For example, when text-based chats are routed to individual virtual assistants, those texts are typically not analyzed to optimize the conversation. The difficulties are compounded when the systems fail to accurately characterize user communications, leading to incorrect and/or irrelevant responses from the virtual assistants and user dissatisfaction.

SUMMARY

Illustrative embodiments provide conversational gateway techniques using machine learning.

In one embodiment, a method comprises receiving at least one natural language input, and determining an intent of the at least one natural language input. In the method, a virtual assistant of a plurality of virtual assistants is recommended to respond to the at least one natural language input based at least in part on the determined intent, and the at least one natural language input is transmitted to the recommended virtual assistant. The determining and recommending are performed using one or more machine learning models, and the plurality of virtual assistants respectively correspond to a plurality of different functions of an enterprise.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

These and other features and advantages of embodiments described herein will become more apparent from the accompanying drawings and the following detailed description.

BRIEF DESCRIPTION OF THE DRAWINGS

FIG. 6 depicts example pseudocode for intent analysis and classification according to an illustrative embodiment.

FIG. 8 depicts the use of intent identification to simplify two conversations according to an illustrative embodiment.

FIG. 10 depicts a table including details of dialog enrichment training data according to an illustrative embodiment.

FIG. 11 depicts a table including details of the creation of predictors and labels in connection with dialog enrichment training data according to an illustrative embodiment.

FIG. 13 depicts example pseudocode for dialog analysis and enrichment according to an illustrative embodiment.

FIG. 16 depicts example pseudocode for virtual assistant recommendation according to an illustrative embodiment.

FIG. 17 depicts a process for analyzing incoming natural language inputs and recommending appropriate virtual assistants according to an illustrative embodiment.

DETAILED DESCRIPTION

Figure 1:
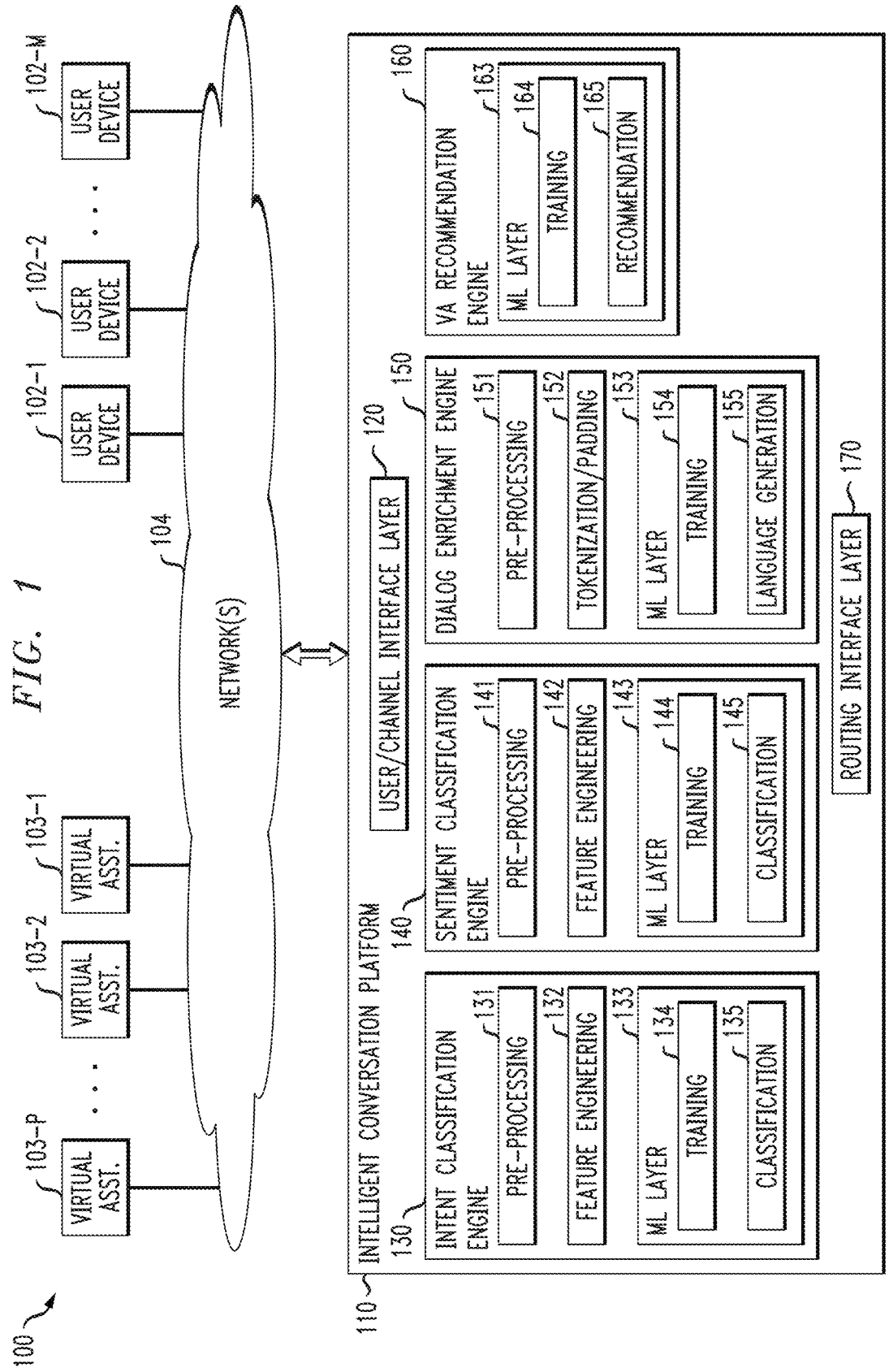
FIGS. 1 and 2 depict details of information processing systems with intelligent conversation platforms for analyzing incoming natural language inputs and recommending appropriate virtual assistants according to illustrative embodiments.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

As used herein, "natural language" is to be broadly construed to refer to any language that has evolved naturally in humans. Non-limiting examples of natural languages include, for example, English, Spanish, French and Hindi.

As used herein, "natural language processing (NLP)" is to be broadly construed to refer to interactions between computers and human (natural) languages, where computers are able to derive meaning from human or natural language input, and respond to requests and/or commands provided by a human using natural language.

As used herein, "natural language understanding (NLU)" is to be broadly construed to refer to a sub-category of natural language processing in AI where natural language input is disassembled and parsed to determine appropriate syntactic and semantic schemes in order to comprehend and use languages. NLU may rely on computational models that draw from linguistics to understand how language works, and comprehend what is being said by a user.

As used herein, "natural language generation (NLG)" is to be broadly construed to refer to a computer process that transforms data into natural language. For example, NLG systems decide how to put concepts into words. NLG can be accomplished by training ML models using a corpus of human-written texts.

In an illustrative embodiment, ML techniques are used to provide a conversational neuron system that analyzes the intent of each dialog or message initiated by a user, identify its context and connect the user with the appropriate virtual assistant for that dialog or message. One or more embodiments provide an optimized ML framework combining select ML techniques to provide a single point of access (e.g., gateway) to answer all user queries across multiple functional divisions of an enterprise. The gateway performs a combination of intent analysis, sentiment analysis, dialog enrichment and virtual assistant recommendation. The embodiments ensure user requests can be effectively and efficiently handled through the management and control of different automated virtual assistants in each functional area of an enterprise, such as, for example, procurement, inventory, order fulfillment, order manufacturing and logistics.

FIG. 1 shows an information processing system 100 configured in accordance with an illustrative embodiment. The information processing system 100 comprises user devices 102-1, 102-2, . . . 102-M (collectively "user devices 102") and virtual assistants 103-1, 103-2, . . . 103-P (collectively "virtual assistants 103"). The user devices 102 and virtual assistants 103 communicate over a network 104 with each other and with an intelligent conversation platform 110.

The user devices 102 can comprise, for example, Internet of Things (IoT) devices, desktop, laptop or tablet computers, mobile telephones, or other types of processing devices capable of communicating with the intelligent conversation platform 110 over the network 104. Such devices are examples of what are more generally referred to herein as "processing devices." Some of these processing devices are also generally referred to herein as "computers." The user devices 102 may also or alternately comprise virtualized computing resources, such as virtual machines (VMs), containers, etc. The user devices 102 in some embodiments comprise respective computers associated with a particular company, organization or other enterprise.

The virtual assistants 103 can comprise, for example, chatbots or other software applications that can be used to conduct online conversations with users via text or speech, in lieu of providing direct contact with a live human agent. The virtual assistants 103 simulate a conversational partner, and may be used in connection with, for example, information acquisition, user queries, customer service and request routing. The virtual assistants 103 may be executed on one or more processing devices or virtualized computing resources. The variables M and P and other similar index variables herein such as K, L and N are assumed to be arbitrary positive integers greater than or equal to two.

The terms "client," "customer" or "user" herein are intended to be broadly construed so as to encompass numerous arrangements of human, hardware, software or firmware entities, as well as combinations of such entities. Intelligent conversation services may be provided for users utilizing one or more machine learning models, although it is to be appreciated that other types of infrastructure arrangements could be used. At least a portion of the available services and functionalities provided by the intelligent conversation platform 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the intelligent conversation platform 110, as well as to support communication between the intelligent conversation platform 110 and connected devices (e.g., user devices 102) and/or other related systems and devices not explicitly shown.

In some embodiments, the user devices 102 are assumed to be associated with repair technicians, system administrators, information technology (IT) managers, software developers release management personnel or other authorized personnel configured to access and utilize the intelligent conversation platform 110.

The intelligent conversation platform 110 in the present embodiment is assumed to be accessible to the user devices 102, and vice-versa, over the network 104. In addition, the intelligent conversation platform 110 and the user devices 102 can access the virtual assistants 103 over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The intelligent conversation platform 110, on behalf of respective infrastructure tenants each corresponding to one or more users associated with respective ones of the user devices 102, provides a platform for analyzing incoming natural language inputs and recommending appropriate virtual assistants.

Referring to FIG. 1, the intelligent conversation platform 110 comprises a user/channel interface layer 120, an intent classification engine 130, a sentiment classification engine 140, a dialog enrichment engine 150, a virtual assistant (VA) recommendation engine 160 and a routing interface layer 170. The intent classification, sentiment classification and dialog enrichment engines 130, 140 and 150 each include a pre-processing component 131/141/151 and a machine learning (ML) layer 133/143/153 comprising a training component 134/144/154. The intent and sentiment classification engines each include a feature engineering component 132/142 and a classification component 135/145. The dialog enrichment engine 150 includes a tokenization/padding component 152 and a language generation component 155. The virtual assistant recommendation engine 160 includes an ML layer 163 comprising training and recommendation components 164 and 165.

Different enterprise segments may enable and train different respective virtual assistants to support respective enterprise functions. For example, a virtual assistant may be developed, trained and deployed to address one enterprise function. According to an embodiment, enterprises enable respective virtual assistants to support respective enterprise functions, and train the assistants to execute greetings, format conversations, and integrate with channels for multilingual communications. These multiple virtual assistants independently serve different enterprise needs. The intelligent conversation platform 110 integrates all of the virtual assistants in a single centralized framework to respond to multiple user questions and/or concerns across an enterprise.

The intelligent conversation platform 110 includes the intent classification engine 130, sentiment classification engine 140, dialog enrichment engine 150 and VA recommendation engine 160 that autonomously performs intent analysis and classification, sentiment analysis and classification, dialog enrichment and virtual assistant recommendation. In addition, as described in more detail in connection with the user/channel and routing interface layers 220 and 270 of FIG. 2, the user/channel and routing interface layers 120 and 170 mediate and integrate users (via user devices 102) with virtual assistants 103. The intelligent conversation platform 110 also includes components responsible for security (e.g., authentication and authorization of users for multiple dialogs and sessions), and session state management components to store dialog states and maintain contexts of multiple dialogs from the same user.

Figure 5:
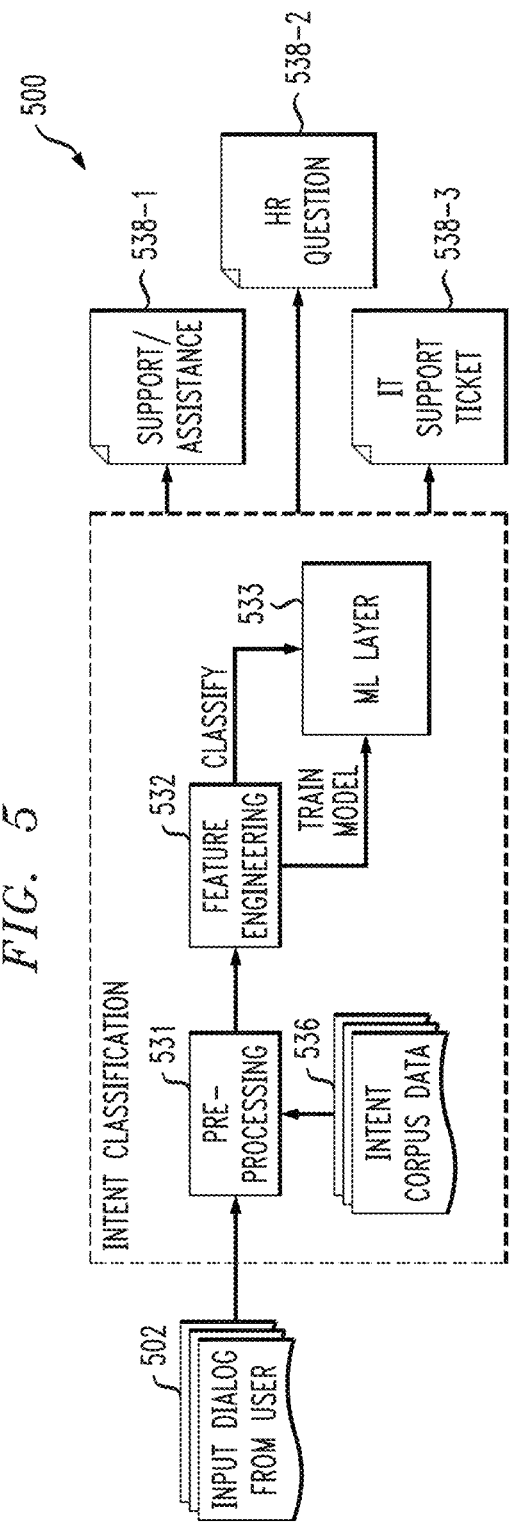
FIG. 5 depicts details of an operational flow for intent classification according to an illustrative embodiment.

Referring to FIGS. 1 and 5, the intent classification engine 130 uses NLU and neural networks to analyze messages and classify intent. The embodiments base a dialog where the words come one after another over a period of time, on a time series model, and leverage a Recurrent Neural Network (RNN). In order to efficiently analyze a message, the embodiments use a bi-directional RNN, which uses two separate processing sequences, one from left to right and another from right to left. In order to address RNNs having exploding or vanishing gradient issues for longer and complex dialogs or messages, the embodiments utilize a bi-directional RNN with long short-term memory (LSTM) for the NLU.

The machine learning model used by the ML layer 133 is a bi-directional with LSTM model. Unlike a traditional neural network, where input and output are independent, in an RNN the output from a previous step feeds into the input of a current step. As a result, when performing language processing, previous words are taken into account when predicting subsequent words of a sentence. An RNN includes a hidden state which remembers one or more words in the sentence. The bi-directional RNN of the embodiments performs bi-directional processing of a sentence (from past and from future in two directions in parallel). A bi-directional RNN addresses problems where sentences are too long, and some previous words in the sentence are not available due to limited hidden states. In addition, LSTM utilized by the embodiments introduces advanced memory units and gates to an RNN to improve accuracy and performance of the machine learning model.

Figure 3:
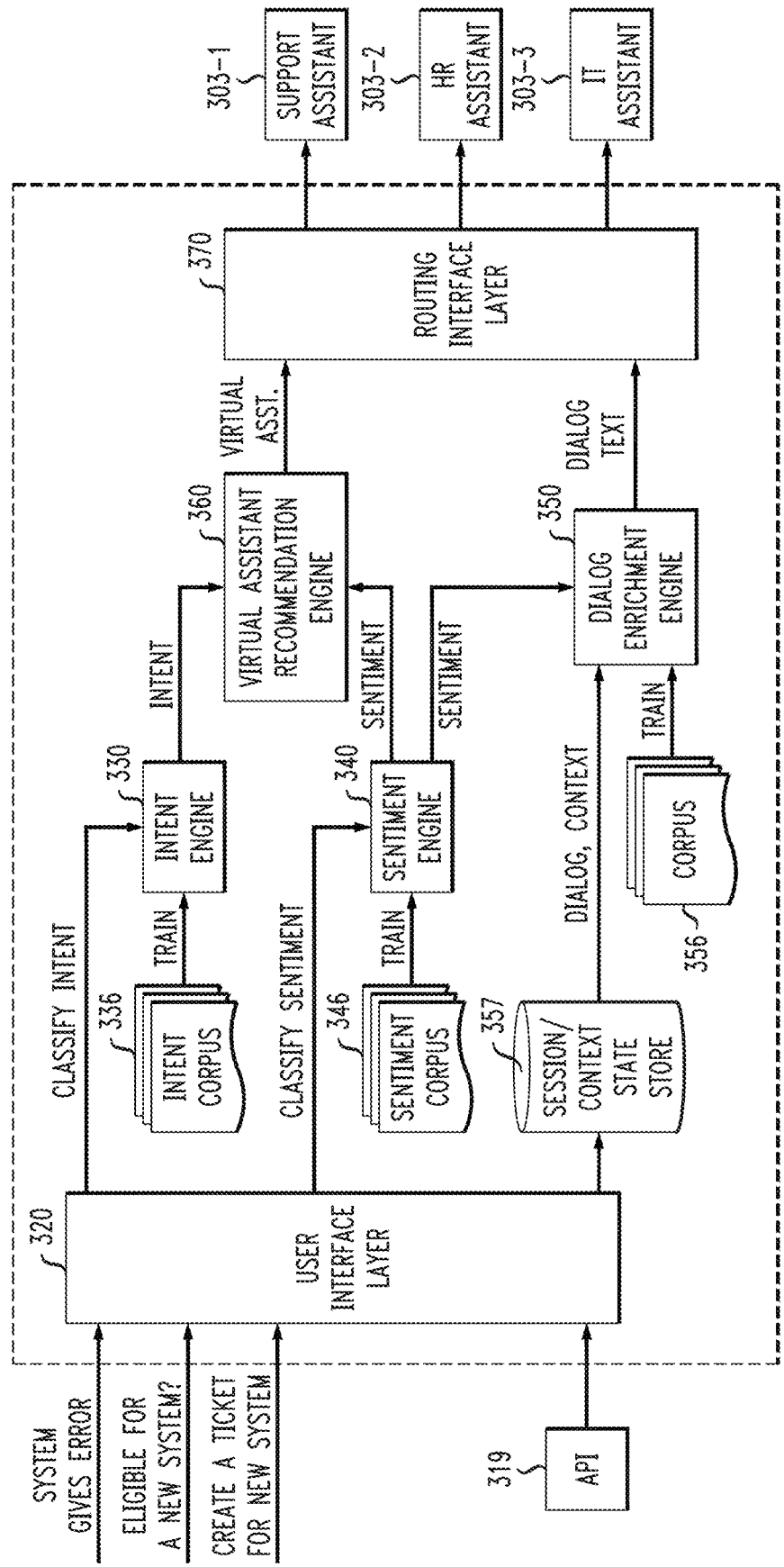
FIG. 3 depicts details of an operational flow for analyzing incoming natural language inputs and recommending appropriate virtual assistants according to an illustrative embodiment.
Figure 4:
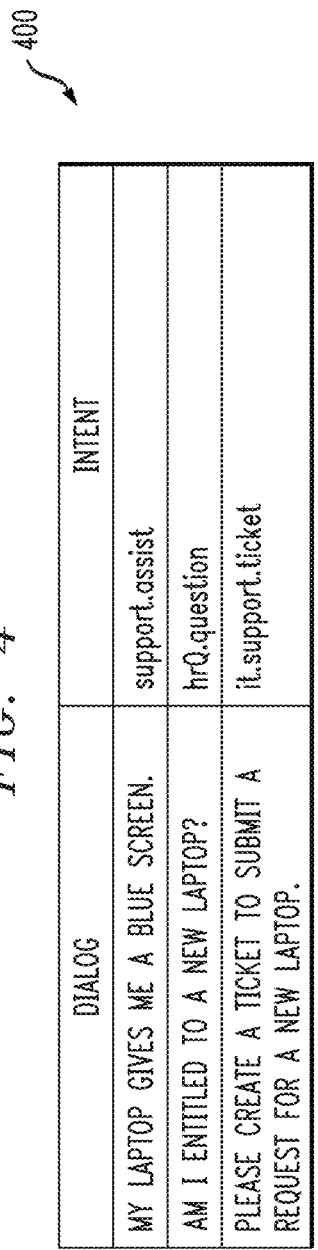
FIG. 4 depicts a table including details of intent training data according to an illustrative embodiment.

Referring to the operational flows 300 and 500 in FIGS. 3 and 5, intent analysis by the intent classification engine (e.g., intent classification engine 330, which is the same or similar to the intent classification engine 130) uses intent corpus data 336/536 to train the machine learning model. This corpus data contains words and/or phrases and the corresponding intent associated with each of the words and/or phrases. A small sample of the intent corpus data used to train the machine learning model is shown in the table 400 in FIG. 4. Referring to the table 400, natural language dialog samples are shown as corresponding to intents related to requests for support or assistance ("support.assist"), human resources (HR) questions ("hrQ.question") and information technology support tickets ("it.support.ticket"). The training data is input to the training component 134 of the ML layer 133 to train the machine learning model.

Referring to FIGS. 1 and 5, according to an embodiment, a pre-processing component 131/531 cleans any unwanted characters and stop words from the corpus data. The pre-processing further comprises stemming and lemmatization, as well as changing text to lower case, removing punctuation, and removing incorrect or unnecessary characters. Once pre-processing and data cleanup is performed, the feature engineering component 132/532 tokenizes the input list of words in the sentences and/or phrases. Tokenization can be performed using, for example, a Keras library or a natural language toolkit (NLTK) library. A Keras tokenizer class can be used to index the tokens. After tokenization is performed, the resulting words are padded to make the words have equal lengths so that the words can be used in the machine learning model. A list of intents is indexed and fed into the machine model for training. The intents may be one-hot encoded before being input to the model. Some features and/or parameters used in connection with the creation of the bi-directional RNN with LSTM model include an Adam optimizer, Softmax activation function, batch size and a number of epochs. These parameters or features are tuned to get the best performance and accuracy of the model. After the model is trained with the intent corpus training data, the model is used to predict the intent for incoming dialogs and/or messages. The accuracy of the model is calculated for hyperparameter tuning.

Referring to the operational flow 500 for intent classification in FIG. 5, input dialog 502 (e.g. a natural language input) is pre-processed and engineered by the pre-processing and feature engineering components 531 and 532 (also pre-processing and feature engineering components 131 and 132 in FIG. 1), and then input to the ML layer 533 (also ML layer 133 in FIG. 1) so that intent can be classified (e.g., by the classification component 135) using the trained machine learning model. Some example classified intents including, for example, support/assistance 538-1, HR question 538-2 and IT support ticket 538-3, are shown as outputs of the operational flow 500.

FIG. 6 depicts example pseudocode 600 for intent analysis and classification according to an illustrative embodiment. For the implementation of the intent classification engine 130/330, Python language and NumPy, Pandas, Keras and NLTK libraries can be used.

Figure 7:
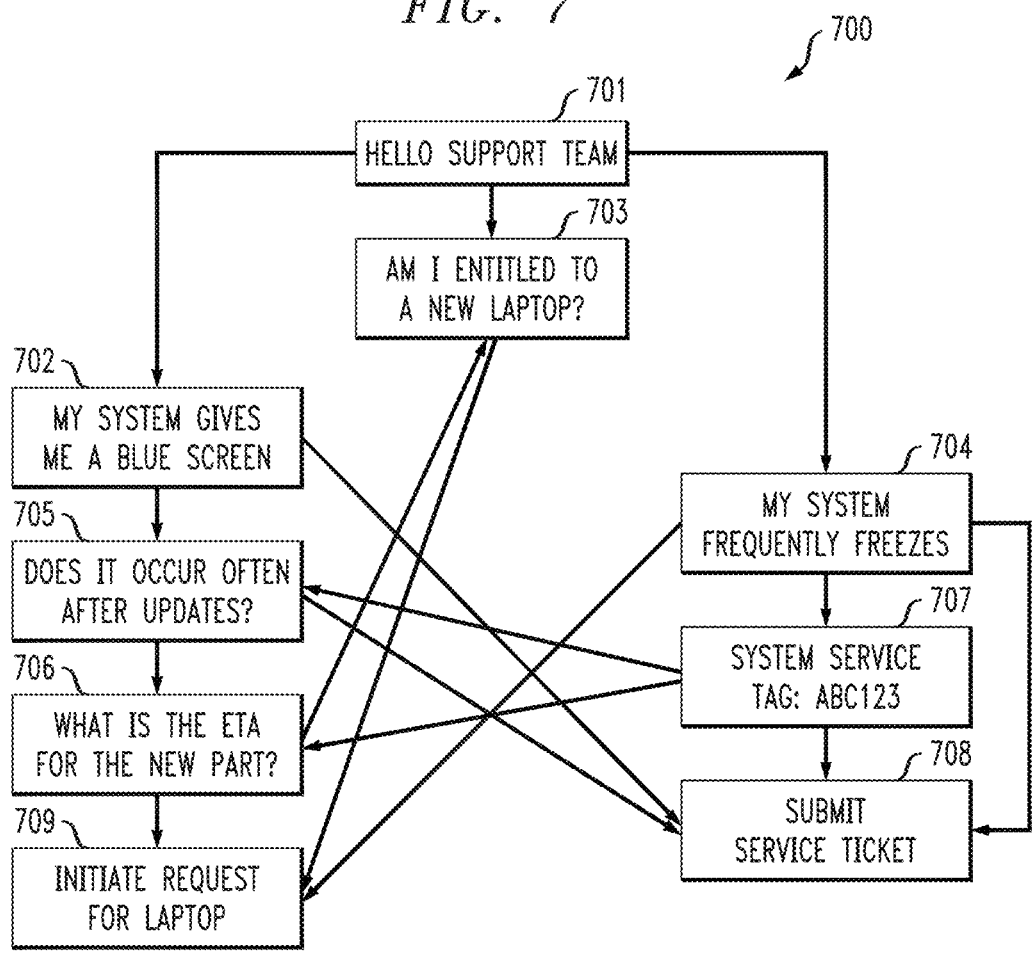
FIG. 7 depicts a flow diagram of using intent identification to shorten conversations in connection with integration of support and service processes according to an illustrative embodiment.

Intent identification based on previous learning shortens conversations and identifies correct communication intent. Referring to the flow 700 in FIG. 7, multiple intents can be classified and integrated using the intent classification engine 130/330/530. For example, in the flow 700, support/assistance, human resources and IT support ticket intents are integrated to shorten time to reach a resolution. For example, once a support team is contacted (block 701), the dialog may begin with requests in blocks 702, 703 or 704. Depending on the dialog and the classified intent, request 702 may lead to a service ticket submission (block 708) without going through the other blocks or lead to a service ticket submission (block 708) through block 705, or to a request for a laptop (block 709) through blocks 705 and 706 or through blocks 705, 706 and 703. Depending on the dialog and the classified intent, requests 703 and 704 may lead to a request for a laptop (block 709) without going through the other blocks, and request 704 may lead to a service ticket submission (block 708) through block 707, through blocks 705 and 707 or without going through the other blocks. Request 704 can also lead to a request for a laptop (block 709) through blocks 707, 706 and 703. FIG. 8 shows paths 805 and 810 for the application of intent analysis to simplify conversations and confirm the right context before connecting to a virtual assistant.

Figure 9:
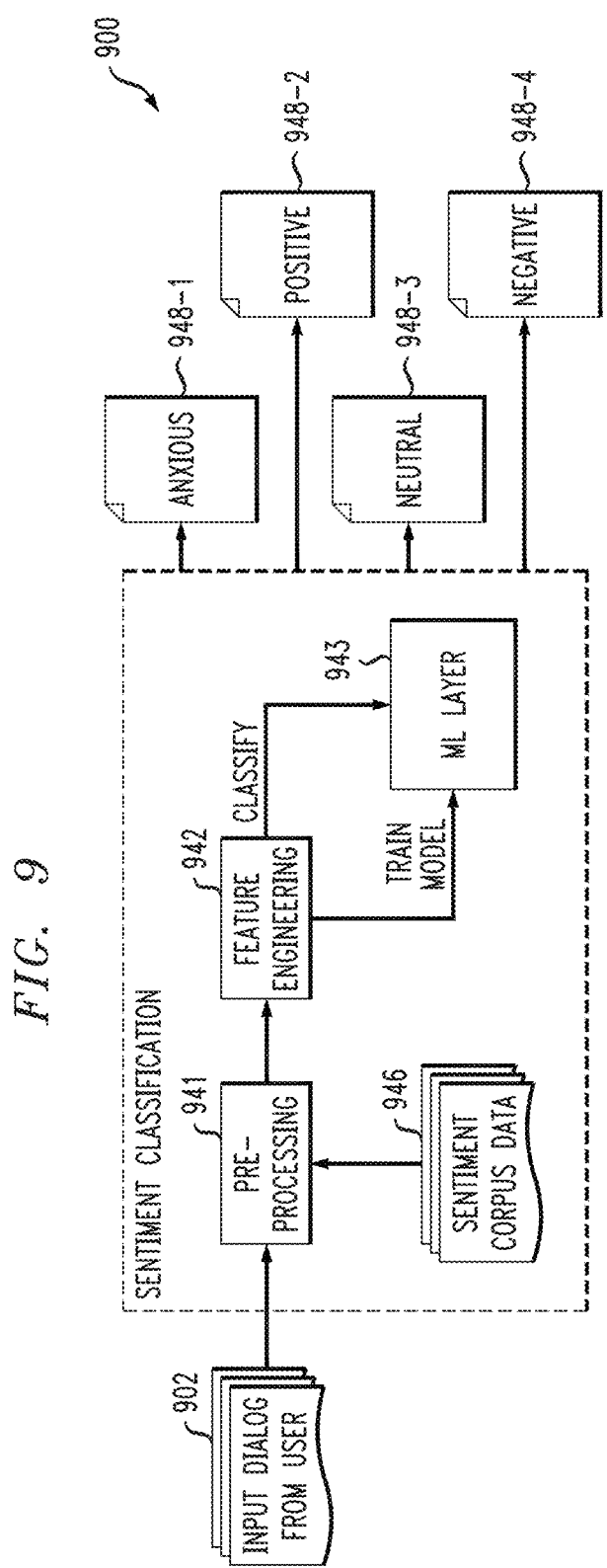
FIG. 9 depicts details of an operational flow for sentiment classification according to an illustrative embodiment.

Referring to FIGS. 1, 3 and 9, the sentiment classification engine 140/340 uses NLU to analyze messages and predict the sentiment of a dialog. The sentiment classification engine 140 follows the same or similar patterns and algorithms as the intent classification engine 130. Instead of intent corpus data, the sentiment classification engine 130 uses sentiment corpus data 346/946 and follows the same or similar steps including data pre-processing with a pre-processing component 141 and feature engineering with a feature engineering component 142, before training a bi-directional RNN with LSTM model for predicting sentiment. Similar to the intent classification engine 130, the sentiment classification engine 140 includes an ML layer 143 with training and classification components 144 and 145.

Referring to the operational flows 300 and 900 in FIGS. 3 and 9, sentiment analysis by the sentiment classification engine (e.g., sentiment classification engine 340, which is the same or similar to the intent classification engine 140) uses sentiment corpus data 346/946 to train the machine learning model. This corpus data contains words and/or phrases and the corresponding sentiment associated with each of the words and/or phrases. For example, sentiment refers to how a user's request can be characterized in terms of tone or a nature of a request (e.g., positive, negative, neutral, anxious, concerned, etc.). A priority of a request can be determined based on sentiment. For example, a negative, anxious or concerned sentiment may lead to an urgent or high priority, while a neutral or positive sentiment may lead to a normal, mid-level or low priority. The training data is input to the training component 144 of the ML layer 143 to train the machine learning model.

Referring to the operational flow 900 for sentiment classification in FIG. 9, input dialog 902 (e.g. a natural language input) is pre-processed and engineered by the pre-processing and feature engineering components 941 and 942 (also pre-processing and feature engineering components 141 and 142 in FIG. 1), and then input to the ML layer 943 (also ML layer 143 in FIG. 1) so that sentiment can be classified (e.g., by the classification component 145) using the trained machine learning model. Some example classified sentiments including, for example, anxious 948-1, positive 948-2, neutral 948-2 and negative 948-4 are shown as outputs of the operational flow 900.

Figure 12:
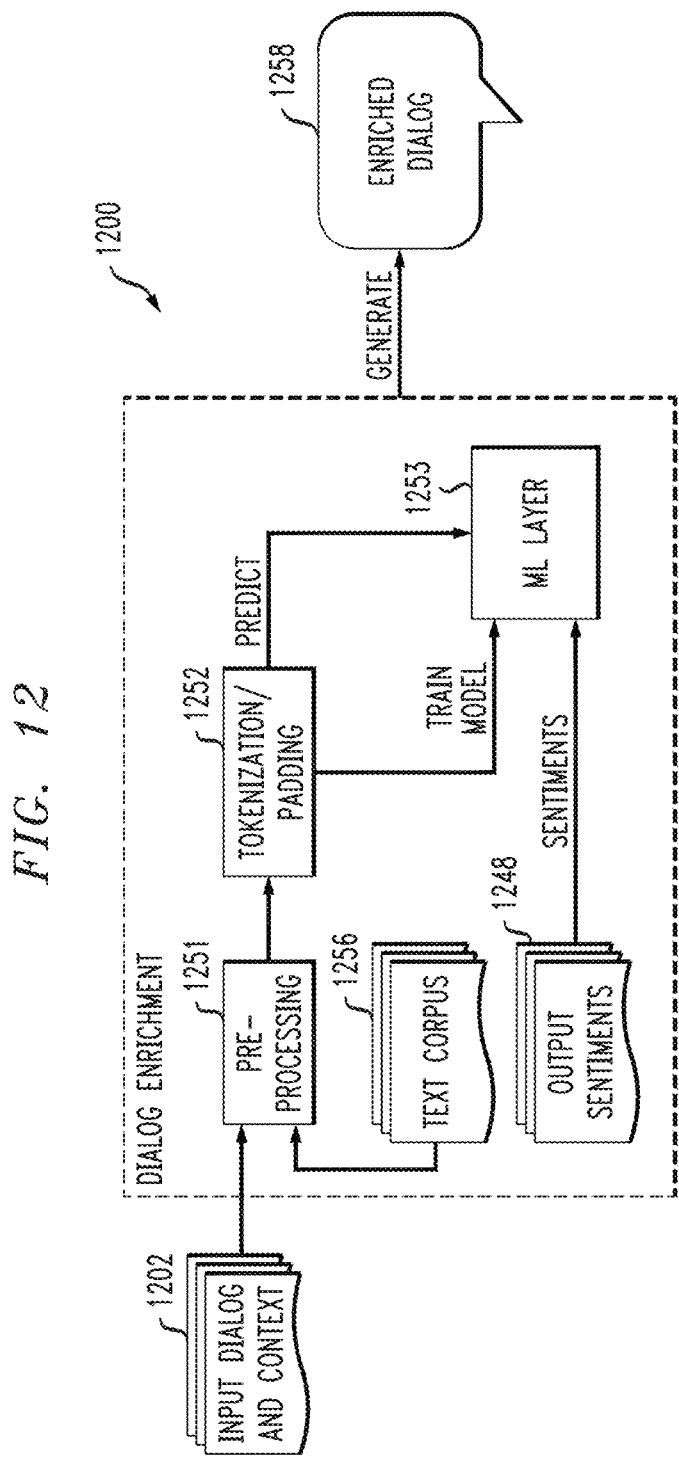
FIG. 12 depicts details of an operational flow for dialog enrichment according to an illustrative embodiment.

Referring to FIGS. 1, 3 and 12, the dialog enrichment engine 150/350 uses NLG and machine learning to add additional text to a conversational dialog from a user. This enrichment adds more context to a dialog before being passed to a downstream virtual assistant 103. The ML layer 153 (also ML layer 1253) utilizes a text generation language model (leveraging a unidirectional RNN with LSTM algorithm) that is trained with a text corpus 356/1256. The trained model learns the likelihood of occurrence of a word based on a previous sequence of words used in the text. Although language models can operate at various levels, according to one or more embodiments, the models operate at an n-gram level.

The dialog enrichment engine 150/350 follows the same or similar dataset preparation steps as the intent and sentiment classification engines 130 and 140, including data pre-processing with a pre-processing component 151. For example, dataset preparation includes removal of punctuation, stemming, lemmatization, converting words to lowercase, etc. The dialog enrichment engine 150/350 uses a different corpus than the intent and sentiment classification engines 130 and 140 to train its machine learning model to perform NLG. The corpus 356/1256 includes dialog/text to be generated and associated words/tokens to be matched. A sample of the corpus data used to train the machine learning model for the dialog enrichment engine 150/350 is shown in the table 1000. For example, the dialog to be generated states that "My work device is unusable, so this needs to be addressed urgently," and the tokens to be matched include "system", "bsod", "blue screen", "not working", "work machine" and "work laptop."

In the next step of language modeling, a tokenization/padding component 152/1252 tokenizes sentences by extracting tokens (e.g., terms/words) from the corpus. Keras tokenization functions can be used for this purpose. After datasets are generated with sequences of tokens, the sequences could vary in length. The tokenization/padding component 152/1252 performs padding to make these sequences the same length. Before the sequences are input into the ML model, predictors and labels are created. According to an embodiment, an n-gram sequence is selected as a predictor and the next word of the n-gram as a label. For example, the corpus 356/1256 further comprises the predictors and corresponding labels as shown in the table 1100 in FIG. 11.

Similar to the intent and sentiment classification engines 130 and 140, the dialog enrichment engine includes an ML layer 153 with a training component 154. The ML layer further includes a language generation component 155. The model used by the ML layer 153 (and ML layer 1253) comprises a Bi-LSTM model, which is a type of RNN. The various layers in this model include:

1. Input Layer: Takes the sequence of words as input.
2. LSTM Layer: Computes the output using LSTM units. For example, 100 units are added in the layer, but this number can be tuned for accuracy.
3. Dropout Layer: A regularization layer which randomly deactivates some neurons in the LSTM layer to prevent over-fitting. This layer is optional.
4. Output Layer: Computes the probability of the best possible next word as output.

Once the machine learning model is trained with the predictors and labels, the language generation component 155 generates dialog to be added to an incoming dialog and context 1202. Referring to the operational flow 1200 for dialog enrichment in FIG. 12, input dialog and context 1202 (e.g. a natural language input and context from, for example, a session/context state store 357) is pre-processed and engineered by the pre-processing and tokenization/padding components 1251 and 1252 (also pre-processing and tokenization/padding components 151 and 152 in FIG. 1), and then input to the ML layer 1253 (also ML layer 153 in FIG. 1) along with output sentiments 1248 from the sentiment classification engine 140/340. The ML layer 1255 (e.g. language generation component 155) generates the enriched dialog 1258 to be added to the incoming request in order to augment the request. For example, referring to FIG. 3, the enriched dialog text is transmitted to one or more of the virtual assistants 303 (e.g., support assistant 303-1, HR assistant 303-2 and/or IT assistant 303-3) via the routing interface layer 370.

FIG. 13 depicts example pseudocode 1300 for dialog analysis and enrichment according to an illustrative embodiment. For the implementation of the dialog enrichment engine 150/350, Python language and NumPy, Pandas and Keras libraries can be used.

Figures 14, 15:
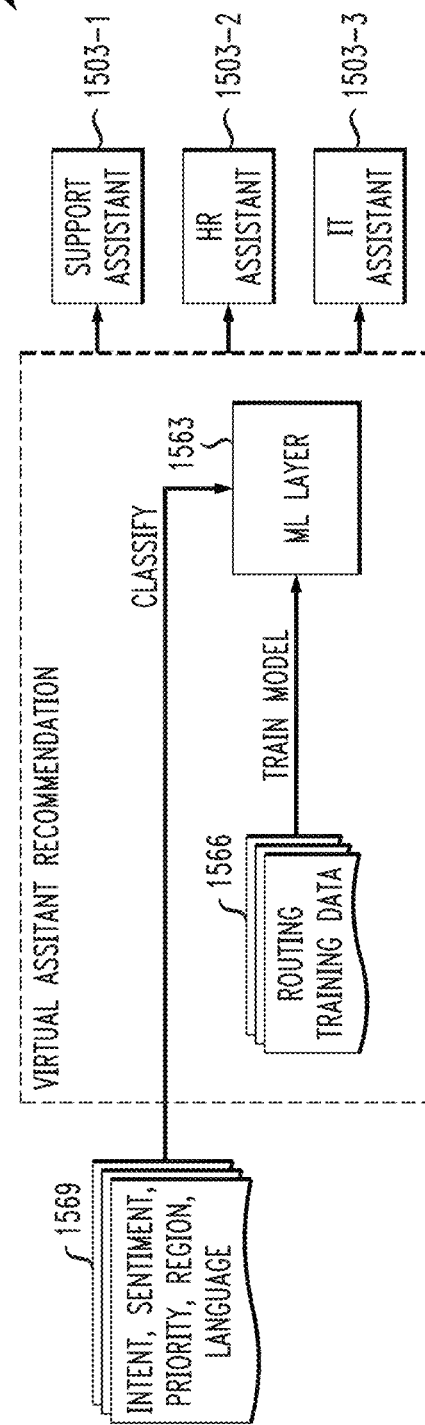
FIG. 14 depicts a table including details of virtual assistant recommendation training data according to an illustrative embodiment.
FIG. 15 depicts details of an operational flow for virtual assistant recommendation according to an illustrative embodiment.

Referring to FIGS. 1, 3 and 15, the VA recommendation engine 160/360 uses intent, sentiments, and other contextual information (e.g., priority, region and language) as input to statistical algorithms to recommend the best downstream virtual assistant 103/303/1503 for a conversation. The VA recommendation engine 160 leverages an ensemble, decision tree-based bagging technique referred to as Random Forest, for multinomial classification of virtual assistants. This model uses historical training data containing multi-dimension data points to train the model. A sample of the training data 1566 used to train the machine learning model is shown in the table 1400 in FIG. 14. For example, the training data includes virtual assistants each corresponding to, for example, a combination of an intent, a sentiment, a priority, a region and a language. For example, a support virtual assistant corresponds to a support assist intent, an HR express virtual assistant corresponds to an HR support intent, a negative sentiment and an urgent priority, while an HR normal virtual assistant corresponds to a neutral sentiment and a normal priority. The training data is input to a training component 164 of the ML layer 163 to train the machine learning model.

Once the model is fully trained, a state of the conversation (e.g., intent, sentiment and context) is passed to the model so that the recommendation component 165 can predict the back-end virtual assistant 103. Referring to FIG. 15, a combination of intent, sentiment, priority, region and language 1569 are provided to the ML layer 1563 so that a virtual assistant recommendation can be made based on the inputted state of the conversation. Referring to FIG. 3, the intent and sentiment are output from the intent and sentiment classification engines 330 and 340. The different intents and virtual assistants can relate to respective functions of an enterprise such as, but not necessarily limited to, procurement, inventory, order fulfillment, order manufacturing and logistics, support, human resources, IT, etc. Non-limiting examples of some of the virtual assistants 1503-1, 1503-2 and 1503-3 that can be recommended are shown in FIG. 15.

The Random Forest algorithm uses a large group of complex decision trees and can provide predictions with high degree of accuracy on any size of data. In the VA recommendation engine 160/360, the machine learning algorithm predicts the recommended virtual assistant along with an accuracy percentage. Accuracy of the model can be improved by hyperparameter tuning.

FIG. 16 depicts example pseudocode 1600 for virtual assistant recommendation according to an illustrative embodiment. The pseudocode 1600 references the use of a Random Forest classifier.

Figure 2:
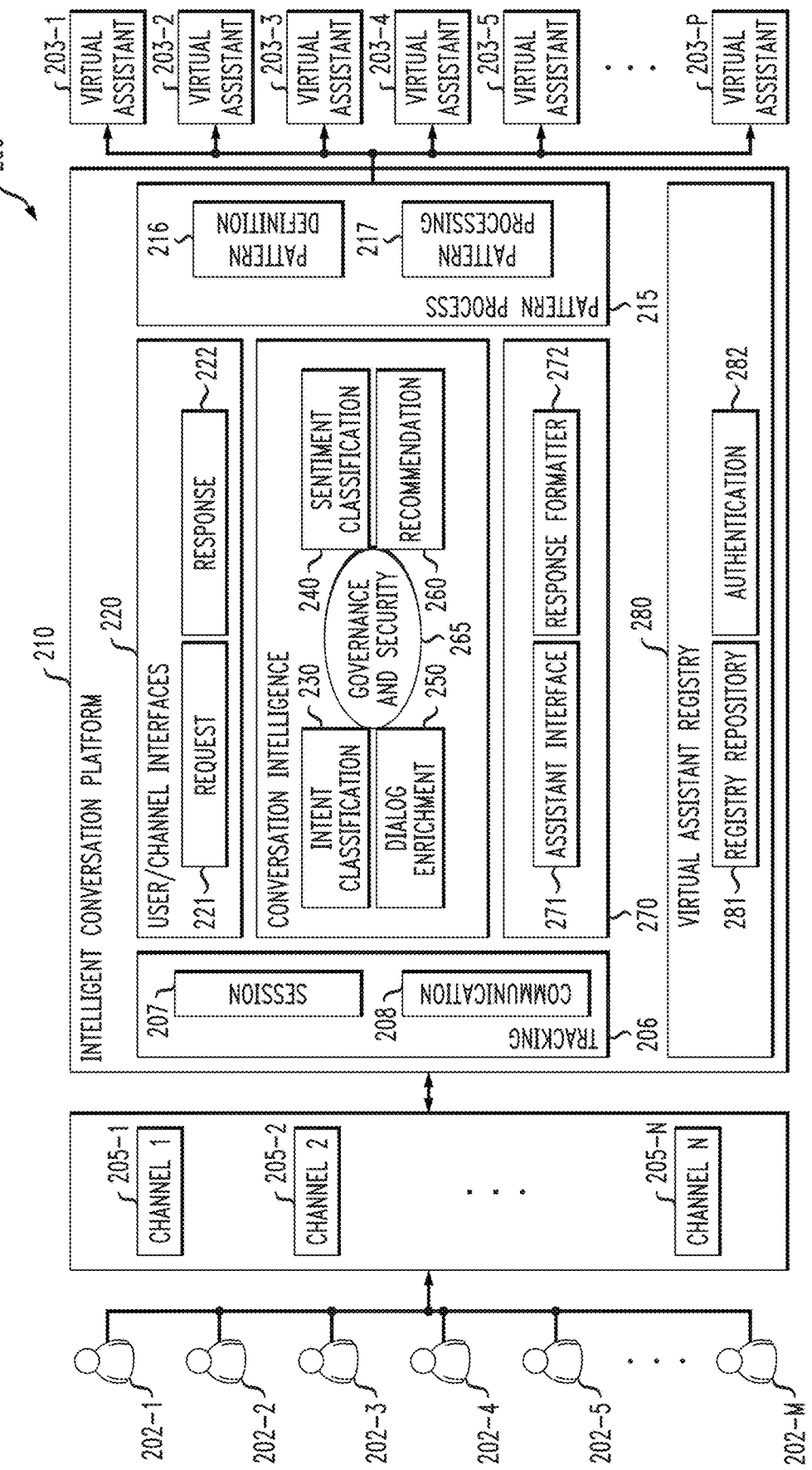

Referring to FIG. 2, a plurality of users 202-1, 202-2, 202-3, 202-4, 202-5, . . . 202-M (collectively "users 202") access the intelligent conversation platform 210 and one or more of a plurality of virtual assistants 203-1, 203-2, 203-3, 203-4, 203-5, . . . 203-P (collectively "virtual assistants 203") through a plurality of channels 1, 2, . . . N 205-1, 205-2, . . . 205-N (collectively "channels 205"). The channels 205 comprise, for example, applications providing hosting and synchronization services and/or other services which facilitate and/or provide users with access to online communication. The user/channel interface layer 220 and the routing interface layer 270 provide interfaces for users 202 to access the intelligent conversation platform 210 and recommended virtual assistants 203 via one or more of the channels 205. The user/channel interface layer 220 comprises request and response components 221 and 222, the routing interface layer 270 comprises assistant interface and response formatter components 271 and 272.

The request component 221 receives and processes incoming requests from users 202 (e.g., via user devices 102). The requests comprise natural language inputs comprising, for example, statements, queries, requests for services (e.g., information technology (IT), human resources (HR)) requests), requests for documents, requests for help/support, requests for information, requests for status, and other types of requests or statements. Some examples of requests are shown in FIG. 3 (e.g., "System gives BSOD (Blue Screen of Death) error", "Eligible for a new system?" and "Create a ticket for a New System"). The response component 222 receives and processes outgoing responses to users 202. The responses comprise natural language responses provided by the virtual assistants 203 to the user's incoming requests. The response component 222 may convert responses received from the virtual assistants 203 to natural language and/or format the responses to be displayed via one or more of the channels 205 on different types of interfaces (e.g., mobile, webpage, audio, etc.). The user/channel interface layer 220 comprises one or more application programming interfaces (APIs) (e.g., API 319 in FIG. 3) to interface with the channels 205, different elements of the intelligent conversation platform 210 and/or the virtual assistants 203. The routing interface layer 270 also comprises one or more APIs to interface with different elements of the intelligent conversation platform 210 and/or the virtual assistants 203. For example, the assistant interface component 271 includes one or more APIs to interface with the virtual assistants 203. The assistant interface component 271 interfaces with the virtual assistant recommendation engine 260 to receive recommended virtual assistants 203 to respond to specific incoming requests, and forwards the request(s) to the recommended virtual assistant(s) 203. The response formatter component 272 receives responses to requests from the virtual assistants 203, and formats the responses to be processed by the intelligent conversation platform 210, and processed by the user/channel interface layer 220. The user/channel and routing interface layers 220 and 270 facilitate interactions between devices of multiple types (e.g., physical, virtual, mobile, desktop) through multiple mediums (e.g., web, cellular, satellite, etc.). For example, the user/channel and routing interface layers 220 and 270 standardize communications, and format responses and/or virtual assistant recommendations based on different interface types.

The intelligent conversation platform 210 includes a virtual assistant registry 280 including a registry repository 281 that stores virtual assistant details such as, for example, high-level intents, language and communication patterns for each of the virtual assistants 203. The virtual assistant registry 281 further includes an authentication component 282 providing a gateway to authenticate users 202 and/or systems when users 202 and/or systems commence communications, and to secure and abstract virtual assistants 203 and their details.

As part of the conversation intelligence, the intent classification engine 230 analyzes incoming natural language statements to identify the intents of conversations. The intent classification engine 230 identifies the context of conversations between users 202 and virtual assistants 203 when determining intent. The intent classification engine 230 determines and understands an intent of a conversation, which is used by the virtual assistant recommendation engine 260 to choose an appropriate virtual assistant to respond to a request. The intent classification engine 230 uses machine learning to learn from the previous conversations and determine a path of dialog through heuristic approaches to find the right topic pattern to suggest for a given conversation in order to select an appropriate virtual assistant to answer a given question. As explained in more detail herein, respective intents correspond to respective functions of an enterprise (e.g., sales, services, inventory, procurement, logistics, HR, IT, support, etc.).

The sentiment classification engine 240 analyzes incoming natural language statements to identify the sentiments of conversations. The sentiment classification engine 240 determines and understands a sentiment of a conversation, which is used by the virtual assistant recommendation engine 260 to choose an appropriate virtual assistant to respond to a request. The sentiment classification engine 240 uses machine learning to learn from the previous conversations and determine a path of dialog through heuristic approaches to find the right sentiment to suggest for a given conversation in order to select an appropriate virtual assistant to answer a given question. As explained in more detail herein, respective sentiments correspond to how a user's request can be characterized in terms of tone or a nature of a request (e.g., positive, negative, neutral, anxious, concerned, etc.).

The intent and sentiment classification engines 230 and 240, and the dialog enrichment and virtual assistant recommendation engines 250 and 260 are the same or similar to the intent and sentiment classification engines 130 and 140, and the dialog enrichment and virtual assistant recommendation engines 150 and 160 discussed in connection with FIG. 1.

A tracing layer 206 includes communication and session components 207 and 208. The session component 208 monitors states of dialogs between users 202 and virtual assistants 203. For example, the session component 208 manages and accurately tracks representation of current dialog statuses based on a sequence of comments and/or text produced by the users 202 and virtual assistants 203. The session component 208 also tracks questions and answers based on a series of utterances extracted from a dialog between users 202 and virtual assistants 203. The tracing layer 206 stores conversations as well the path the conversations followed (e.g., to which virtual assistants). The tracing layer 206 captures feedback about the recommended virtual assistants and the responses to the requests (e.g., successes and failures).

The pattern process engine 215 includes pattern definition and pattern processing components 216 and 217. The pattern processing component 217 ties in conversation requests with responses patterns defined by the pattern definition component 216.

The governance and security component 265 monitors governance, risk and compliance (GRC) for an enterprise in connection with the provision of an intelligent conversation platform 210. The governance and security component 265 provides, for example, regulatory and corporate compliance management (RCCM) for managing the ever-changing laws and regulations with which an enterprise or organization, such as, for example, a corporation, financial institution or healthcare provider, must comply. The governance and security component 265 manages, for example, an enterprise's security, risks and controls across the organization by supporting and recording dialogs between users 202 and virtual assistants 203 and by applying and/or implementing regulations, controls, procedures and/or audits for the interactions between users 202 and virtual assistants 203.

According to one or more embodiments, databases, repositories (e.g., registry repository 280), stores (e.g., session/context store 357) and/or corpuses (e.g., corpuses 336/536, 346/946 and 356/1256) used by the intelligent conversation platform 110 can be configured according to a relational database management system (RDBMS) (e.g., PostgreSQL). Databases, repositories, stores and/or corpuses in some embodiments are implemented using one or more storage systems or devices associated with the intelligent conversation platform 110. In some embodiments, one or more of the storage systems utilized to implement the databases comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the intelligent conversation platform 110, user/channel interface layer 120, the intent classification engine 130, the sentiment classification engine 130, the dialog enrichment engine 140, the VA recommendation engine 160 and the routing interface layer 170 in other embodiments can be implemented at least in part externally to the intelligent conversation platform 110, for example, as stand-alone servers, sets of servers or other types of systems coupled to the network 104. For example, the intent classification engine 130, the sentiment classification engine 130, the dialog enrichment engine 140 and the VA recommendation engine 160 may be provided as cloud services accessible by the intelligent conversation platform 110.

The user/channel interface layer 120, the intent classification engine 130, the sentiment classification engine 130, the dialog enrichment engine 140, the VA recommendation engine 160 and the routing interface layer 170 in the FIG. 1 embodiment are each assumed to be implemented using at least one processing device. Each such processing device generally comprises at least one processor and an associated memory, and implements one or more functional modules for controlling certain features of the user/channel interface layer 120, the intent classification engine 130, the sentiment classification engine 130, the dialog enrichment engine 140, the VA recommendation engine 160 and/or the routing interface layer 170.

At least portions of the intelligent conversation platform 110 and the components thereof may be implemented at least in part in the form of software that is stored in memory and executed by a processor. The intelligent conversation platform 110 and the components thereof comprise further hardware and software required for running the intelligent conversation platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the user/channel interface layer 120, the intent classification engine 130, the sentiment classification engine 130, the dialog enrichment engine 140, the VA recommendation engine 160, the routing interface layer 170 and other components of the intelligent conversation platform 110 in the present embodiment are shown as part of the intelligent conversation platform 110, at least a portion of the user/channel interface layer 120, the intent classification engine 130, the sentiment classification engine 130, the dialog enrichment engine 140, the VA recommendation engine 160, the routing interface layer 170 and other components of the intelligent conversation platform 110 in other embodiments may be implemented on one or more other processing platforms that are accessible to the intelligent conversation platform 110 over one or more networks. Such components can each be implemented at least in part within another system element or at least in part utilizing one or more stand-alone components coupled to the network 104.

It is assumed that the intelligent conversation platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the user/channel interface layer 120, the intent classification engine 130, the sentiment classification engine 130, the dialog enrichment engine 140, the VA recommendation engine 160, the routing interface layer 170 and other components of the intelligent conversation platform 110, and the elements thereof can each be implemented in the form of one or more LXCs running on one or more VMs. Other arrangements of one or more processing devices of a processing platform can be used to implement the user/channel interface layer 120, the intent classification engine 130, the sentiment classification engine 130, the dialog enrichment engine 140, the VA recommendation engine 160 and the routing interface layer 170, as well as other components of the intelligent conversation platform 110. Other portions of the system 100 can similarly be implemented using one or more processing devices of at least one processing platform.

Distributed implementations of the system 100 are possible, in which certain components of the system reside in one datacenter in a first geographic location while other components of the system reside in one or more other data centers in one or more other geographic locations that are potentially remote from the first geographic location. Thus, it is possible in some implementations of the system 100 for different portions of the intelligent conversation platform 110 to reside in different data centers. Numerous other distributed implementations of the intelligent conversation platform 110 are possible.

Accordingly, one or each of the user/channel interface layer 120, the intent classification engine 130, the sentiment classification engine 130, the dialog enrichment engine 140, the VA recommendation engine 160, the routing interface layer 170 and other components of the intelligent conversation platform 110 can each be implemented in a distributed manner so as to comprise a plurality of distributed components implemented on respective ones of a plurality of compute nodes of the intelligent conversation platform 110.

It is to be appreciated that these and other features of illustrative embodiments are presented by way of example only, and should not be construed as limiting in any way.

Accordingly, different numbers, types and arrangements of system components such as the user/channel interface layer 120, the intent classification engine 130, the sentiment classification engine 130, the dialog enrichment engine 140, the VA recommendation engine 160, the routing interface layer 170 and other components of the intelligent conversation platform 110, and the elements thereof can be used in other embodiments.

It should be understood that the particular sets of modules and other components implemented in the systems 100 and 200 as illustrated in FIGS. 1 and 2 are presented by way of example only. In other embodiments, only subsets of these components, or additional or alternative sets of components, may be used, and such components may exhibit alternative functionality and configurations.

For example, as indicated previously, in some illustrative embodiments, functionality for the intelligent conversation platform can be offered to cloud infrastructure customers or other users as part of FaaS, CaaS and/or PaaS offerings.

The operation of the information processing system 100 and/or 200 will now be described in further detail with reference to the flow diagram of FIG. 17. With reference to FIG. 17, a process 1700 for automatically generating unique and meaningful product titles and descriptions as shown includes steps 1702 through 1708, and is suitable for use in the system 100 and/or 200 but is more generally applicable to other types of information processing systems comprising an intelligent conversation platform configured for analyzing incoming natural language inputs and recommending appropriate virtual assistants.

In step 1702, at least one natural language input is received, and in step 1704, an intent of the at least one natural language input is determined using one or more machine learning models. The one or more machine learning models comprises a bi-directional RNN with LSTM for NLU.

In step 1706, using the one or machine learning models, a virtual assistant of a plurality of virtual assistants is recommended to respond to the at least one natural language input based at least in part on the determined intent. The plurality of virtual assistants respectively correspond to a plurality of different functions of an enterprise. In step 1708, the at least one natural language input is transmitted to the recommended virtual assistant.

The process may further comprise identifying a function of the plurality of different functions corresponding to the determined intent. According to one or more embodiments, an additional intent of the at least one natural language input is determined, an additional virtual assistant of the plurality of virtual assistants is recommended to respond to the at least one natural language input based at least in part on the determined additional intent, and the at least one natural language input is transmitted to the recommended additional virtual assistant. An additional function of the plurality of different functions corresponding to the determined additional intent is identified.

In accordance with an embodiment, the one or more machine learning models are trained with data comprising a plurality of natural language statements and a plurality of intents corresponding to the plurality of natural language statements.

The process further includes determining a sentiment of the at least one natural language input. The determining of the sentiment is performed using the one or more machine learning models trained with data comprising a plurality of natural language statements and a plurality of sentiments corresponding to the plurality of natural language statements. The recommending of the virtual assistant is further based on the determined sentiment. A sentiment can be, for example, a negative sentiment, a positive sentiment, a neutral sentiment or an anxious sentiment. A priority of the at least one natural language input is determined based on the determined sentiment, and the recommending of the virtual assistant is further based on the determined priority.

The one or more machine learning models may also be trained with data comprising a plurality of intents, a plurality of sentiments, a plurality of priorities and respective ones of a plurality of virtual assistants corresponding to the pluralities of intents, sentiments and priorities.

According to an embodiment, at least one of a natural language word and a natural language phrase is generated to add to the at least one natural language input. The generating is performed using the one or more machine learning models trained with data comprising a plurality of predictors and a plurality of labels corresponding to the plurality of predictors. The at least one of the generated natural language word and the generated natural language phrase is transmitted to the recommended virtual assistant with the at least one natural language input, and is based at least in part on a determined sentiment.

It is to be appreciated that the FIG. 17 process and other features and functionality described above can be adapted for use with other types of information systems configured to execute intelligent conversation services in an intelligent conversation platform or other type of platform.

The particular processing operations and other system functionality described in conjunction with the flow diagram of FIG. 17 is therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 17 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with an intelligent conversation platform as disclosed herein can provide a number of significant advantages relative to conventional arrangements. For example, unlike conventional techniques, the embodiments advantageously use machine learning techniques to analyze incoming natural language inputs and recommend appropriate virtual assistants. The embodiments provide functionality for combining select machine learning techniques to provide a single point of access for different virtual assistants to address all user questions and/or concerns across an enterprise. Advantageously, the embodiments provide a framework to autonomously perform intent and sentiment analysis, as well as dialog enrichment of natural language inputs, and to recommend virtual assistants to respond to the natural language inputs based on the analyzed intent and sentiments and other factors including, but not necessarily limited to priority, region and language.

Conventional approaches fail to maintain a registry of virtual assistants and perform intent analysis of user requests, and do not provide users with seamless access to multiple virtual agents for dialogs having multiple intents. The embodiments advantageously leverage machine learning techniques to perform NLU and NLG to analyze conversational intent and provide a centralized gateway to multiple virtual assistants when a conversation from the same user spans different topics. An intelligent conversational platform abstracts the complexities of using multiple virtual assistants to transparently provides a single façade for each conversation.

Advantageously, the embodiments provide an optimized machine learning framework that combines select machine learning techniques to provide a single point of access for multiple user queries across multiple functional divisions of an enterprise. The intelligent conversational platform performs a combination of intent analysis, sentiment analysis, dialog enrichment and virtual assistant recommendation to ensure that user requests are effectively and efficiently handled through the management and control of different automated assistants in each functional area of an enterprise. The single conversational gateway for multiple enterprise functions standardizes communication and analyzes user intent and sentiment to assign appropriate virtual assistants to correctly answer given queries.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system components such as the intelligent conversation platform 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and an intelligent conversation platform in illustrative embodiments. These and other cloud-based systems in illustrative embodiments can include object stores.

Illustrative embodiments of processing platforms will now be described in greater detail with reference to FIGS. 18 and 19. Although described in the context of system 100, these platforms may also be used to implement at least portions of other information processing systems in other embodiments.

Figure 18:
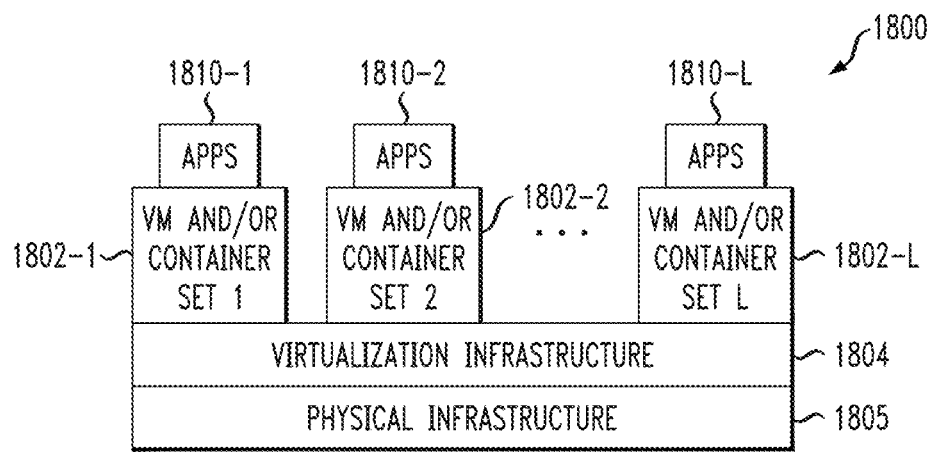
FIGS. 18 and 19 show examples of processing platforms that may be utilized to implement at least a portion of an information processing system according to illustrative embodiments.
Figure 19:
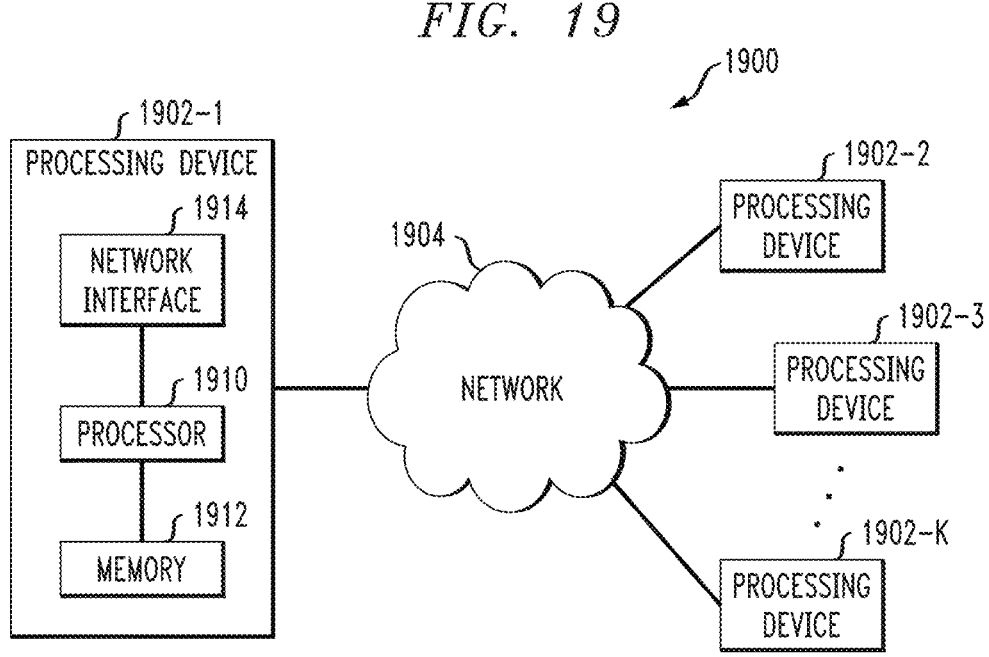

FIG. 18 shows an example processing platform comprising cloud infrastructure 1800. The cloud infrastructure 1800 comprises a combination of physical and virtual processing resources that may be utilized to implement at least a portion of the information processing system 100. The cloud infrastructure 1800 comprises multiple virtual machines (VMs) and/or container sets 1802-1, 1802-2, . . . 1802-L implemented using virtualization infrastructure 1804. The virtualization infrastructure 1804 runs on physical infrastructure 1805, and illustratively comprises one or more hypervisors and/or operating system level virtualization infrastructure. The operating system level virtualization infrastructure illustratively comprises kernel control groups of a Linux operating system or other type of operating system.

The cloud infrastructure 1800 further comprises sets of applications 1810-1, 1810-2, . . . 1810-L running on respective ones of the VMs/container sets 1802-1, 1802-2, . . . 1802-L under the control of the virtualization infrastructure 1804. The VMs/container sets 1802 may comprise respective VMs, respective sets of one or more containers, or respective sets of one or more containers running in VMs.

In some implementations of the FIG. 18 embodiment, the VMs/container sets 1802 comprise respective VMs implemented using virtualization infrastructure 1804 that comprises at least one hypervisor. A hypervisor platform may be used to implement a hypervisor within the virtualization infrastructure 1804, where the hypervisor platform has an associated virtual infrastructure management system. The underlying physical machines may comprise one or more distributed processing platforms that include one or more storage systems.

In other implementations of the FIG. 18 embodiment, the VMs/container sets 1802 comprise respective containers implemented using virtualization infrastructure 1804 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1800 shown in FIG. 18 may represent at least a portion of one processing platform. Another example of such a processing platform is processing platform 1900 shown in FIG. 19.

The processing platform 1900 in this embodiment comprises a portion of system 100 and includes a plurality of processing devices, denoted 1902-1, 1902-2, 1902-3, . . . 1902-P, which communicate with one another over a network 1904.

The network 1904 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1902-1 in the processing platform 1900 comprises a processor 1910 coupled to a memory 1912. The processor 1910 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1912 may comprise random access memory (RAM), read-only memory (ROM), flash memory or other types of memory, in any combination. The memory 1912 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1902-1 is network interface circuitry 1914, which is used to interface the processing device with the network 1904 and other system components, and may comprise conventional transceivers.

The other processing devices 1902 of the processing platform 1900 are assumed to be configured in a manner similar to that shown for processing device 1902-1 in the figure.

Again, the particular processing platform 1900 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more components of the intelligent conversation platform 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and intelligent conversation platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
   receiving at least one natural language input;
   determining an intent of the at least one natural language input;
   recommending a virtual assistant of a plurality of virtual assistants to respond to the at least one natural language input based at least in part on the determined intent;
   generating at least one of a natural language word and a natural language phrase to add to the at least one natural language input based, at least in part, on one or more matched tokens from the at least one natural language input;
   determining a sentiment of the at least one natural language input, wherein the at least one of the generated natural language word and the generated natural language phrase is based at least in part on the determined sentiment; and
   transmitting the at least one natural language input augmented with the at least one of the generated natural language word and the generated natural language phrase to the recommended virtual assistant;
   wherein at least the determining of the intent and the recommending are performed using one or more machine learning models;
   wherein the plurality of virtual assistants respectively correspond to a plurality of different functions of an enterprise; and
   wherein the steps of the method are executed by a processing device operatively coupled to a memory.

2. The method of claim 1, further comprising identifying a function of the plurality of different functions corresponding to the determined intent.

3. The method claim 2, further comprising:
   determining an additional intent of the at least one natural language input;
   recommending an additional virtual assistant of the plurality of virtual assistants to respond to the at least one natural language input based at least in part on the determined additional intent; and
   transmitting the at least one natural language input to the recommended additional virtual assistant.

4. The method of claim 3, further comprising identifying an additional function of the plurality of different functions corresponding to the determined additional intent.

5. The method of claim 1, further comprising training the one or more machine learning models with data comprising a plurality of natural language statements and a plurality of intents corresponding to the plurality of natural language statements.

6. The method of claim 1, wherein the one or more machine learning models comprises a bi-directional recurrent neural network with long short-term memory for natural language understanding.

7. The method of claim 1,
   wherein the determining of the sentiment is performed using the one or more machine learning models; and
   wherein the recommending of the virtual assistant is further based on the determined sentiment.

8. The method of claim 1, wherein the sentiment is one of a negative sentiment, a positive sentiment, a neutral sentiment and an anxious sentiment.

9. The method of claim 7, further comprising:
determining a priority of the at least one natural language input based on the determined sentiment;
wherein the recommending of the virtual assistant is further based on the determined priority.

10. The method of claim 9, further comprising training the one or more machine learning models with data comprising a plurality of intents, a plurality of sentiments, a plurality of priorities and respective ones of the plurality of virtual assistants corresponding to the pluralities of intents, sentiments and priorities.

11. The method of claim 1, wherein:
the determining of the sentiment is performed using the one or more machine learning models; and
the method further comprises training the one or more machine learning models with data comprising a plurality of natural language statements and a plurality of sentiments corresponding to the plurality of natural language statements.

12. The method of claim 1,
wherein the generating is performed using the one or more machine learning models.

13. The method of claim 12, further comprising training the one or more machine learning models with data comprising a plurality of predictors and a plurality of labels corresponding to the plurality of predictors.

14. An apparatus comprising:
a processing device operatively coupled to a memory and configured to:
receive at least one natural language input;
determine an intent of the at least one natural language input;
recommend a virtual assistant of a plurality of virtual assistants to respond to the at least one natural language input based at least in part on the determined intent;
generate at least one of a natural language word and a natural language phrase to add to the at least one natural language input based, at least in part, on one or more matched tokens from the at least one natural language input;
determine a sentiment of the at least one natural language input, wherein the at least one of the generated natural language word and the generated natural language phrase is based at least in part on the determined sentiment; and
transmit the at least one natural language input augmented with the at least one of the generated natural language word and the generated natural language phrase to the recommended virtual assistant;
wherein the processing device is configured to use one or more machine learning models to perform at least the determining of the intent and the recommending; and
wherein the plurality of virtual assistants respectively correspond to a plurality of different functions of an enterprise.

15. The apparatus of claim 14, wherein the processing device is further configured to train the one or more machine learning models with data comprising a plurality of natural language statements and a plurality of intents corresponding to the plurality of natural language statements.

16. The apparatus of claim 14, wherein the processing device is further configured to:
use the one or more machine learning models to perform the determining of the sentiment;
wherein the recommending of the virtual assistant is further based on the determined sentiment.

17. The apparatus of claim 14, wherein the processing device is further configured to use the one or more machine learning models to perform the generating.

18. An article of manufacture comprising a non-transitory processor-readable storage medium having stored therein program code of one or more software programs, wherein the program code when executed by at least one processing device causes said at least one processing device to perform the steps of:
receiving at least one natural language input;
determining an intent of the at least one natural language input;
recommending a virtual assistant of a plurality of virtual assistants to respond to the at least one natural language input based at least in part on the determined intent;
generating at least one of a natural language word and a natural language phrase to add to the at least one natural language input based, at least in part, on one or more matched tokens from the at least one natural language input;
determining a sentiment of the at least one natural language input, wherein the at least one of the generated natural language word and the generated natural language phrase is based at least in part on the determined sentiment; and
transmitting the at least one natural language input augmented with the at least one of the generated natural language word and the generated natural language phrase to the recommended virtual assistant;
wherein at least the determining of the intent and the recommending are performed using one or more machine learning models; and
wherein the plurality of virtual assistants respectively correspond to a plurality of different functions of an enterprise.

19. The article of manufacture of claim 18,
wherein the determining of the sentiment is performed using the one or more machine learning models; and
wherein the recommending of the virtual assistant is further based on the determined sentiment.

20. The article of manufacture of claim 19, wherein:
the program code further causes said at least one processing device to perform the step of determining a priority of the at least one natural language input based on the determined sentiment; and
wherein the recommending of the virtual assistant is further based on the determined priority.

* * * * *